Dec. 13, 1960  R. W. H. BENSON  2,964,391
MANUFACTURE OF SYNTHETIC LINEAR POLYMERS
Filed Jan. 3, 1958

INVENTOR
RICHARD WILLIAM HAROLD BENSON

BY Cushman, Darby & Cushman
ATTORNEYS

United States Patent Office 2,964,391
Patented Dec. 13, 1960

2,964,391

MANUFACTURE OF SYNTHETIC LINEAR POLYMERS

Richard William Harold Benson, Harrogate, England, assignor to Imperial Chemical Industries Limited, London, England, a corporation of Great Britain Filed Jan. 3, 1958, Ser. No. 706,985

1 Claim. (Cl. 23—285)

This invention relates to an improved process for the manufacture of synthetic linear polymers such as the highly polymeric polymethylene terephthalates. More particularly it relates to a process and an apparatus for the removal of volatilizable substances during the final stages of polymerisation or polycondensation.

In the final stages of polymerisation and polycondensation carried out at elevated temperatures, the synthetic linear polymers used in the manufacture of filaments, fibres and films are very viscous liquid materials. Difficulties are experienced in the removal of volatilizable constituents from these materials, e.g. by evaporation. These and other difficulties cannot be satisfactorily overcome with the conventional agitators, because stratification of the viscous mass occurs. Using a single shaft vertical agitator this stratification is prevalent, whereas a horizontal single shaft multi-blade agitator causes the material to form into a ball. An intermeshing multi-shaft scraper type stirrer is not permissible because of very high local shear which leads to local overheating and degradation of the polymer.

According to my invention I provide an improved process for the manufacture of synthetic linear polymers such as the highly polymeric polymethylene terephthalates. The process comprises heating and agitating the viscous liquid material during the final stages of polymerisation or polycondensation and if required removing volatile constituents, e.g. by evaporation, characterised by transiently shaping the viscous material into fluid layers above the residual level of the liquid, breaking or traversing said layers by other newly formed transient layers of viscous material, the major proportion of said layers being shaped by withdrawing the viscous liquid from below the residual level of the liquid, preferably from the bottom of the vessel containing said viscous liquid material.

Monomers, low molecular weight polymers and substances used in their formation, including catalysts and pigments, are usually present or may be added prior to the final stages of polymerisation or polycondensation.

The synthetic linear polymers which can be processed according to our invention comprise the highly polymeric polymethylene terephthalates to which minor amounts of other polymers such as the corresponding highly polymeric polymethylene isophthalates may be added and which are formed by polycondensation.

From the highly polymeric polymethylene terephthalates, polyethylene terephthalate is the best known. This may be made by heating bis-2-hydroxyethyl terephthalate, which may also contain low molecular weight polymer, under reduced pressure until the fibre and film-forming material having a high molecular weight and an intrinsic viscosity above 0.5 and below 1.2 is obtained. During this polycondensation glycol, which may be present from an earlier stage of the process and which is being formed must be removed from the polymer-containing liquid viscous material by evaporation. In the initial stages of polycondensation large amounts of glycol are evaporated, causing ebullition of the liquid and frothing when high temperatures and low pressures are used. Not much mechanical agitation is required at this stage and the initial quantities of glycol are easily volatilised, but at the later stages when the material becomes more viscous difficulties are experienced. The rate of evaporation of the glycol is affected by the exposed area and in my process I obtain a large exposed area in the transient fluid layers above the residual level of the liquid, combined with good agitation without the use of large mechanical forces.

I also provide an apparatus suitable for carrying out my invention consisting of a polymerisation or polycondensation vessel fitted with means for heating, and a mechanical agitator with means for driving the same. The agitator comprises at least two substantially horizontal driven shafts mounted near the level of the liquid in the vessel, and agitator members, mounted preferably equidistant and substantially parallel to each shaft. The shafts are spaced so that when rotated the agitator members on each move in intermeshing relationship, without touching each other, and so that the members have a minimum clearance of at least 5 mm. This minimum clearance is required to eliminate high local shear forces, which may lead to local overheating and degradation of the polymer.

In one form of the apparatus each shaft is fitted with a number of agitator members of substantially equal length which are mounted on radial supports attached to each shaft. The radial supports may be discs or individual radial arms and the agitator members are preferably attached to them at one end only.

At least two shafts are spaced a sufficient distance apart so that the agitator members attached on one shaft traverse at least the periphery of the area traversed by members on a neighbouring shaft, in intermeshing relationship, in such a way that the members on neighbouring shafts do not touch each other and so that at all times they have a minimum clearance of at least 5 mm. when the shafts are rotated, preferably at the same speed and in the same direction.

To facilitate the shaping and to prolong the duration of the transient fluid layers above the residual level of the liquid, the agitator members may be provided with projections at their unsupported ends. The projections preferably pointing in a radial direction towards the respective shafts on which the members are mounted.

In operation the material is fed to the heated vessel until it is filled to a level preferably not above the axis of the driven shafts. As each set of members rotates on a separate shaft the viscous liquid material adheres to the members and as the members are lifted from the level of the liquid surplus liquid begins to run and drip back into the liquid, thereby forming a continuous layer of liquid flowing from each member. As the members rotate and traverse the path of the members on neighbouring shafts in intermeshing relationship, the layers or curtains flowing from the members are mutually traversed and broken. The viscous layers are thus brought into intimate contact with each other, without much work being done and degradation of the polymer is kept to a minimum. It will be appreciated that the shafts should be rotated at an appropriate speed to allow the liquid shaped into transient layers by the members mounted on one shaft to be broken or traversed by layers on the members of a neighbouring shaft.

My invention is particularly suitable in a continuous process for the manufacture of the synthetic linear polymer when the viscous material requires mechanical agitation and when countercurrent mixing of the liquid and the escape of vapours are no longer possible. The viscous material can then be introduced into a number of reaction zones in series where polymerisation or polycondensation is continued by heating and mechanical agitation using the process of my invention.

For continuous operation one long vessel having a number of zones, or a number of vessels in series may be used, each vessel having one or more mixing zones. The vessels may be inclined slightly to facilitate transfer of the material from the inlet to the outlet end of the vessel and the discharge of the material may be assisted by pumps such as submerged gear or screw pumps.

When a single long vessel is used means should be provided for dividing the vessel into compartments, e.g. with overflow baffle plates, with at least one agitator in each zone or compartment and all agitators being driven from one main drive by mounting the agitators on shafts extending through the vessel.

Means may also be provided for feeding the polymer from the feed end to the discharge end of the vessel. One way of achieving this is to mount the agitator members at a slight angle on each shaft and substantially parallel to each other, so as to obtain a raking action when the shafts are rotated preferably in the same direction and so that the material will advance in an axial direction through the vessel from the feed end to the discharge end thereof.

For the continuous polycondensation particularly of polyethylene terephthalate we provide an apparatus comprising one or more substantially horizontal tubular vessels fitted with an inlet and an outlet valve at each end, with means for heating and evacuating the vessel and a number of mechanical agitators in each vessel, with means for driving said agitators. The agitator in each vessel comprises at least two substantially horizontal driven shafts rotating in the same direction and mounted near the level of the liquid in the vessel, one set of agitator members mounted preferably equidistant and substantially parallel to each shaft, a radial support attached substantially transversely to each shaft for mounting said sets of agitator members by their ends near the periphery of the support, said shafts being spaced so that one set of agitator members on one shaft moves in intermeshing relationship both radially and longitudinally with another set of members on a neighbouring shaft, when the shafts are rotated, without touching each other and with a clearance of at least 5 mm.

The agitator members on each shaft intermesh longitudinally at a distance which is substantially equal to their length. The radial supports are attached to neighbouring shafts at opposite ends of the sets of intermeshing members.

I also provide an apparatus for the continuous polycondensation of polyethylene terephthalate comprising a number of vessels connected in series, means for transferring the material from one vessel to the next and at least one agitator of my invention fitted in each vessel.

When a number of zones are used in the polycondensation of polyethylene terephthalate in a continuous process it is desirable to obtain diminishing agitation in successive zones from the feed end to the discharge end. Using a single vessel having common shafts for the agitators in each zone, agitators having decreasing numbers of agitator members may be used (as illustrated in Figs. 5–7). Diminishing agitation may also be obtained by reducing the distance of the agitator members from the shafts, e.g. by shortening the length of the radial supporting arms, provided intermeshing occurs and the minimum clearance of 5 mm. is maintained. The agitator members should be substantially parallel to each other.

I have found that for the polycondensation of polyethylene terephthalate the spacing of the agitator members in each set should be not less than approximately 3".

The attached drawings illustrate but do not limit my invention.

Figure 1:
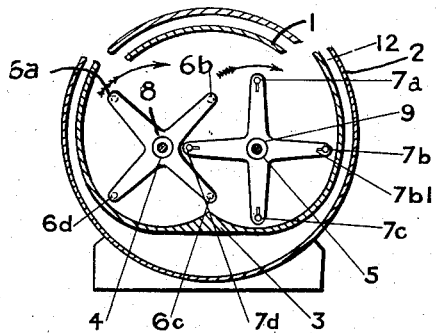
Fig. 1 is a schematic sectional end view of an apparatus showing a jacketed vessel with an agitator with two shafts driven in the same direction, each shaft bearing a set of four equally spaced agitator members mounted on radial supports, spaced to give longitudinal and radial intermeshing between the two sets of agitator members.

Referring to Fig. 1 a polycondensation vessel 1 shown in section through one of the zones in the vessel is fitted with a heating jacket 2 for circulating heating fluid in the space 12 between the outer wall of the vessel and the jacket. A contoured fillet 3 at the bottom of the vessel is shaped to give a clearance of 15 mm. to agitator members of the mechanical agitator inside the vessel which is driven on two parallel horizontal shafts 4 and 5 rotating in the same direction. The shafts are mounted near the level of the liquid. All the agitator members are rods of equal length, circular in cross section with a small projection as shown at 7b1 at one end; they are mounted at their other end on a pair of radial supports 8 and 9, each radial support having four symmetrically spaced radial arms of equal length.

The radial supports 8 and 9 are attached to the parallel horizontal shafts 4 and 5 respectively, at an angular displacement so that the greatest possible clearance for the agitator members is obtained. In the case of four members on each shaft, for example, this is obtained by mounting the members in a vertical cross on one shaft and diagonally on the other shaft (as shown in the drawing). The two shafts 4 and 5 are spaced so that the orbits of the two sets of members on each shaft intersect, without touching each other, but so that there is always a clearance of more han 5 mm. between a member on one shaft and the neighbouring shaft.

The radial supports 8 and 9 are spaced on the shafts 4 and 5 a distance 20 mm. in excess of the projecting length of the members. The relative position of the radial arms 8 and 9 on the parallel shafts 4 and 5 is apparent by reference to Fig. 3. One set of four agitator members is attached at one of their ends near the tips of the four radial arms of support 8 at (6a, 6b, 6c and 6d). The other set of agitator members (7a, 7b, 7c and 7d) is attached on the other radial support 9, the two sets of agitator members 6 and 7 all being parallel to each other and to the shafts 4 and 5, so that the two sets of members intermesh when the shafts are rotated.

Figure 2:
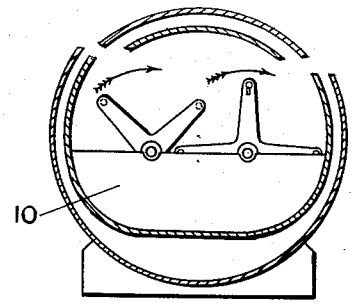
Fig. 2 is a schematic sectional end view of an apparatus showing a baffle plate, for dividing a vessel into zones.

Fig. 2 is a schematic section through a similar vessel as Fig. 1, showing a baffle plate 10 which separates the vessel into zones. A number of such baffle plates are used. The baffle plates may be used as simple overflow baffles.

It will be appreciated that instead of the baffle plates as illustrated, plates may be used which divide the vessel into completely separate zones or compartments closely fitting the contour of the vessel and by providing apertures or valves for communication of the liquid between the zones.

Figure 3:
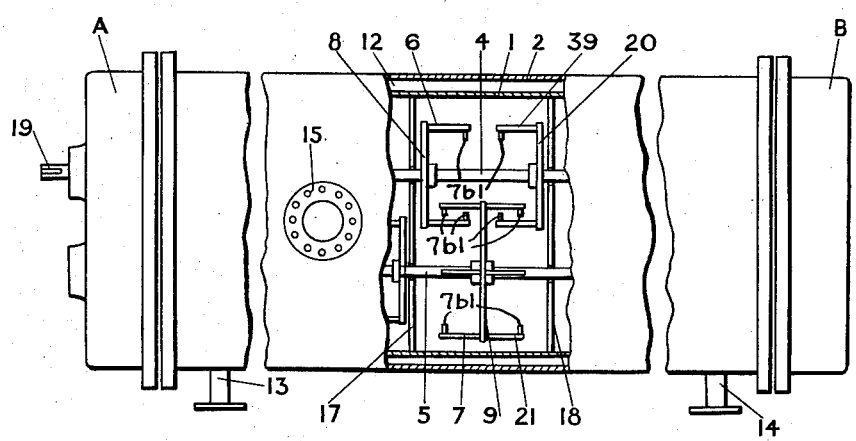
Fig. 3 is a schematic plan view of an apparatus designed for continuous operation in a number of zones, with parts omitted and parts broken away to show the intermeshing members of an agitator of the type shown in Fig. 1.

Fig. 3 illustrates a long tubular vessel resembling in section the apparatus in Fig. 1 suitable for the polycondensation of polyethylene terephthalate in a continuous process. The vessel contains 5 zones between the ends of the vessel A and B. The vessel 1 is provided with a cylindrical jacket 2 for the circulation of heating fluid in the space 12 between the outer wall of the vessel and the jacket 2. A liquid inlet 13 and an outlet 14 are provided near the ends of the vessel and a connection 15 for a vacuum line is on the top near the middle of the vessel. One zone is shown in plan view with one portion of the top half of the vessel and jacket broken away. The vessel is divided into zones by baffle plates 17 and 18 which may be constructed similarly to the baffle plate shown in Fig. 2.

The liquid in each zone is kept in motion by agitators which are driven by a motor connected to shaft 4 at the shaft socket 19 outside the vessel. Shaft 4 transmits the drive by an idler gear to shaft 5 so that both shafts, which are parallel and extend through the whole length of the vessel, rotate in the same direction.

In the zone between the baffle plates 17 and 18 there is a twin agitator which is shown in front view in Fig. 1. It consists of 16 agitator members in 4 sets of 4 members. Two sets are mounted on shafts 4 and two sets on shaft 5. The 4 sets of agitator members are mounted by means of 3 radial supports 8, 9 and 20. One set of agitator members 6 and 7 are mounted in intermeshing relationship on shafts 4 and 5 by means of radial supports 8 and 9 as shown in Fig. 1. The agitator members are attached horizontally and parallel to the shafts 4 and 5 near the tips of the radial supports 8 and 9. The agitator members are stainless steel rods of equal length and circular cross section with projections 7b1 on their unsupported ends. The projections facilitate the formation of the transient layers of the liquid viscous material above the residual level of the liquid. The projections point at right angles from the members parallel to the respective arms of the radial supports, and towards the shafts on which the members are mounted by means of said radial supports. By reference to the drawing it will be apparent that the twin agitator consists of only 3 radial supports 8, 9 and 20, support 20 bearing two sets of members. The second set of intermeshing members 21 projects from the other side of the support 9 in the opposite direction to the set of members 7. The set of four members 21 are intermeshing with a set of 4 members 39 mounted on the neighbouring shaft 4 by means of a radial support 20 having 4 symmetrically spaced radial arms similar to and facing the radial support 8.

The distance by which the radial supports 8 and 9 are spaced along the shafts relative to each other is slightly in excess of the projecting length of the sets of agitator members 6 and 7.

The relative spacing of radial supports 9 and 20 on the shafts 5 and 4 is the same as between the supports 8 and 9.

The spacing of the shafts 4 and 5, the length and relative position of the 4 arms on the radial supports 8, 9 and 20 and their relative angular displacement is such that two sets of agitator members on one shaft are intermeshing with the corresponding sets of agitator members mounted on the other shaft both in an axial and longitudinal direction. All agitator members are of equal lengths and intermeshing occurs without the members touching each other. There is a clearance of at least 15 mm. between the walls of the vessel 1 and the fillet 3 (shown in Fig. 1), as well as between members on one shaft and the neighbouring shaft.

Figure 4:
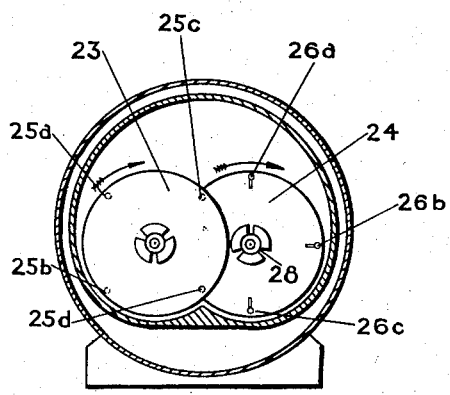
Fig. 4 is a schematic sectional end view of another apparatus in which the agitator members are mounted on spaced perforated discs.

Referring to Fig. 4 the radial supports are in the form of circular discs 23 and 24 each mounted on a pair of parallel shafts, and each bearing two sets of agitator members. Disc 23 bears the members in positions 25a, b, c, d) and the disc 24 shows the members (26a, b, c, d). The discs have perforations near the shafts as shown at 28 to facilitate the transfer of liquid between zones, when the level of the liquid would otherwise be above the level of the shafts.

Figure 5:
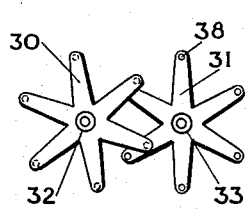
Figs. 5–7 show agitators in end view each having two sets of 6, 4 and 3 agitator members respectively, each mounted on two parallel shafts, designed to give decreasing agitation in successive zones.

Fig. 5 shows an agitator having two identical sets of 6 intermeshing agitator members (as shown at 38 which are each mounted near the tips of two radial supports 30 and 31, each support having 6 symmetrically spaced radial arms and each support being attached on two parallel shafts 32 and 33 which are rotatable in the same direction. The supports 30 and 31 are mounted at right angles on the shafts 32 and 33 formed by the plane of the radial arms. Supports 30 and 31 are spaced along the respective shaft by a distance which is in excess of the length of the projecting agitator members. The agitator members project in opposite directions from the tips of the supports. The members are parallel to each other and parallel to the shafts 32 and 33.

Figure 6:
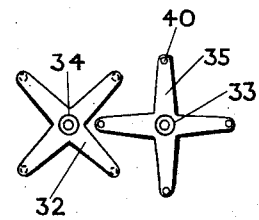

Fig. 6 is an agitator having two sets of two radial supports 34 and 35, each having 4 symmetrical arms at the ends of which the agitator members are attached as described in Fig. 5.

Figure 7:
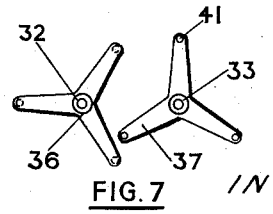

Fig. 7 is an agitator with two sets of 3 agitator members which are mounted by means of two radial supports 36 and 37, each support having 3 symmetrically spaced arms attached to a pair of horizontal parallel shafts 32 and 33.

Agitators of the type shown in Figs. 5–7 may be used when different agitation is required in a number of zones. The agitators are particularly suitable when it is required to obtain different agitation in a number of zones housed in one vessel, because all the agitators may be driven from the same pair of shafts at the same speed.

It will be appreciated that a different agitation from a number of agitators, all mounted on the same shaft may also be obtained by other means. For example, gearing may be provided between the drive shafts and the radial supports, so that successive agitators rotate at decreasing speeds; or the spacing between the shafts may be varied so that the shafts are mounted substantially horizontally but at an angle to each other; or the diameter of the radial supports between successive zones may be altered so that, for example, a decreasing intermeshing and penetration between successive sets of members is obtained; and/or the size and shape of the agitator members may be varied in successive sets of intermeshing members, or any combination of the aforementioned means may be used.

One of the most effective means of obtaining varying agitation in different zones is obtained by changing the speed of the agitators. This may simply be done by having the zones in separate vessels so that there is no difficulty in driving the agitator or sets of agitators in each zone by means of a separate drive, the liquid being transferred from one zone or vessel to the next by means already described. This arrangement of using separate vessels has the advantage that agitation as well as the reaction conditions, e.g. temperature and the reduced pressure, may be controlled independently in each vessel.

Using the arrangement illustrated in the drawings with the radial supports spaced on different shafts by a distance which is in excess of the projecting lengths of the agitator members, an extraordinary deep penetration and intermeshing between orbits described by each set of members on neighbouring shafts may be obtained.

Any material of construction for my apparatus is suitable which will resist the high temperatures and corrosion encountered in polymerisation or polycondensation of a particular material, and we have found stainless steel suitable.

What I claim is:

Apparatus for the manufacture of synthetic linear polymers, comprising: a reaction vessel; means for heating said vessel; agitating mechanism in said vessel; and a plurality of transverse baffle plates dividing said vessel into zones; said agitating mechanism including a pair of laterally spaced shafts mounted within and extending longitudinally of said vessel; means for driving said shafts in the same direction; radial supports mounted on each of said shafts within each of said zones; the supports on one shaft being offset longitudinally from the supports on the other; a plurality of agitator members mounted adjacent the outer extremities of said supports and extending in spaced, substantially parallel relationship to said shafts; and a radially inwardly directed projection at the free end of each of said agitator members; the agitator members in each of said zones intermeshing without contact as the shafts rotate.

References Cited in the file of this patent

UNITED STATES PATENTS

| | | |
|---|---|---|
| 2,233,919 | James | Mar. 4, 1941 |
| 2,650,804 | Marco | Sept. 1, 1953 |
| 2,758,915 | Vodonik | Aug. 14, 1956 |

FOREIGN PATENTS

| | | |
|---|---|---|
| 1,040,547 | France | May 20, 1953 |